Figure 1:
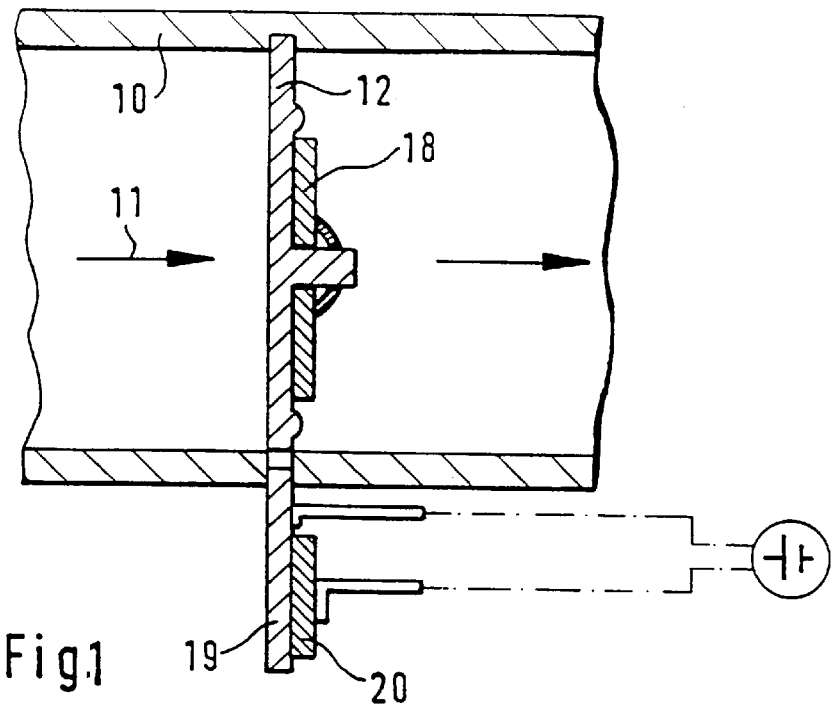

United States Patent

Butz et al.

[11] Patent Number: 6,044,829
[45] Date of Patent: Apr. 4, 2000

[54] HEATING ARRANGEMENT

[75] Inventors: Thomas Butz, Korntal-Muenchingen; Hans-Werner Holch, Heilbronn; Heinz Mueller, Remseck, all of Germany

[73] Assignee: Filterwerk Mann & Hummel GmbH, Ludwigsburg, Germany

[21] Appl. No.: 08/983,454

[22] PCT Filed: May 11, 1996

[86] PCT No.: PCT/EP96/02033

§ 371 Date: Mar. 6, 1998

§ 102(e) Date: Mar. 6, 1998

[87] PCT Pub. No.: WO97/03285

PCT Pub. Date: Jan. 30, 1997

[30] Foreign Application Priority Data

Jul. 13, 1995 [DE] Germany ............................ 195 25 542

[51] Int. Cl.[7] ........................ F02M 31/07; F02M 35/02; F02D 21/08

[52] U.S. Cl. ............................................. 123/573; 123/574
[58] Field of Search ................................... 123/572, 573, 123/574

[56] References Cited

U.S. PATENT DOCUMENTS

| | | | |
|---|---|---|---|
| 3,088,447 | 5/1963 | Henderson | 123/573 |
| 4,768,493 | 9/1988 | Ohtaka et al. | 123/573 |
| 5,024,203 | 6/1991 | Hill | 123/573 |

*Primary Examiner*—Marguerite McMahon
*Attorney, Agent, or Firm*—Evenson, McKeown, Edwards & Lenahan, P.L.L.C.

[57] ABSTRACT

A heating arrangement, particularly for preventing freezing of pipes for delivering crankcase gas from the crankcase of an internal combustion engine to the air intake, in which a valve (12, 18) is provided which includes at least one metal plate, and a PTC thermistor (20) or a resistance heater is disposed on the metal plate.

4 Claims, 5 Drawing Sheets

HEATING ARRANGEMENT

The invention relates to a heating arrangement for warming gases.

A device is disclosed in DE-AS 23 43 185 in which fuel is vaporized in the air intake system of an internal combustion engine by means of hot exhaust gases. For this purpose a heat exchanger is disposed in the intake tube, which is equipped with porous elements through which a fuel-air mixture flows. A portion of the exhaust gases is passed through this heat exchanger. A disadvantage of such systems is that an additional element, namely the heat exchanger element, is necessary, with the result that the cross section of the passage is very greatly reduced. This necessarily increases the resistance to flow. Also, other elements for varying the temperature of gases are known. For example, DE 20 42 907 shows a tube which has a tubular coil within the wall, in which a temperature varying means is introduced. This construction, however, is very complicated and only in the area of the wall does it produce a variation in the temperature of the medium flowing through it.

It is the object of the invention to avoid the aforementioned disadvantages and to provide a heating arrangement for warming gases which will not decrease the flow resistance and which can be produced by simple means.

This object is achieved by the characterizing part of the main claim.

The important advantage of the invention is that it does not require an additional heating element, such as a heating grid for example; instead an element which is disposed in the passage is used for transferring the thermal energy. This element, in an advantageous embodiment of the invention, is a valve which has at least one metal valve plate. On this metal plate, a cold conductor or a resistance heating element is disposed. The transmission of heat to the metal plate provides for a uniform heating of the surroundings, i.e. of the gases flowing through the passage.

The heating arrangement serves to prevent the freezing of ducts through which the crankcase gases of an engine are passed. Especially after a cold start of the engine, and in the case of cold, moist ambient air, the line through which the crankcase gases are conveyed to the clean air area of an air filter can ice up. This icing is effectively prevented by means of the cold conductor or by means of the resistance heating element.

According to one embodiment of the invention, the valve which is provided for vacuum regulation is utilized. Such a valve is arranged at the entrance of the duct carrying the crankcase gases to the clean air part of the air filter, and under operating conditions in which only a very low vacuum prevails in the clean air part of the air filter, it serves to assure a sufficiently great vacuum in the crankcase. Of course, it is also possible to equip a pressure limiting valve which limits any very high suction pressure in the clean air part of the air filter to a maximum level, with a metal valve plate and to provide this metal valve plate with the heating element.

A further embodiment of the invention envisons enclosing the valve parts in an injection molded synthetic resin body. This has the advantage that the valve parts are merely snapped or locked together and the plastic part gives the valve its final form. This reduces the difficulty of assembly, and also a reliable seal is assured.

An alternative embodiment of the invention consists in providing the duct for conveying the crankcase gases with a tube carrying cooling water. This tube extends substantially in the core of the duct and thus likewise provides for a uniform warming of the gases surrounding the tube. Such a combination is especially simple to produce, and has the advantage that no electrical energy is required.

These and other features of preferred embodiments of the invention will be found not only in the claims but also in the description and the drawings.

Figure 5:
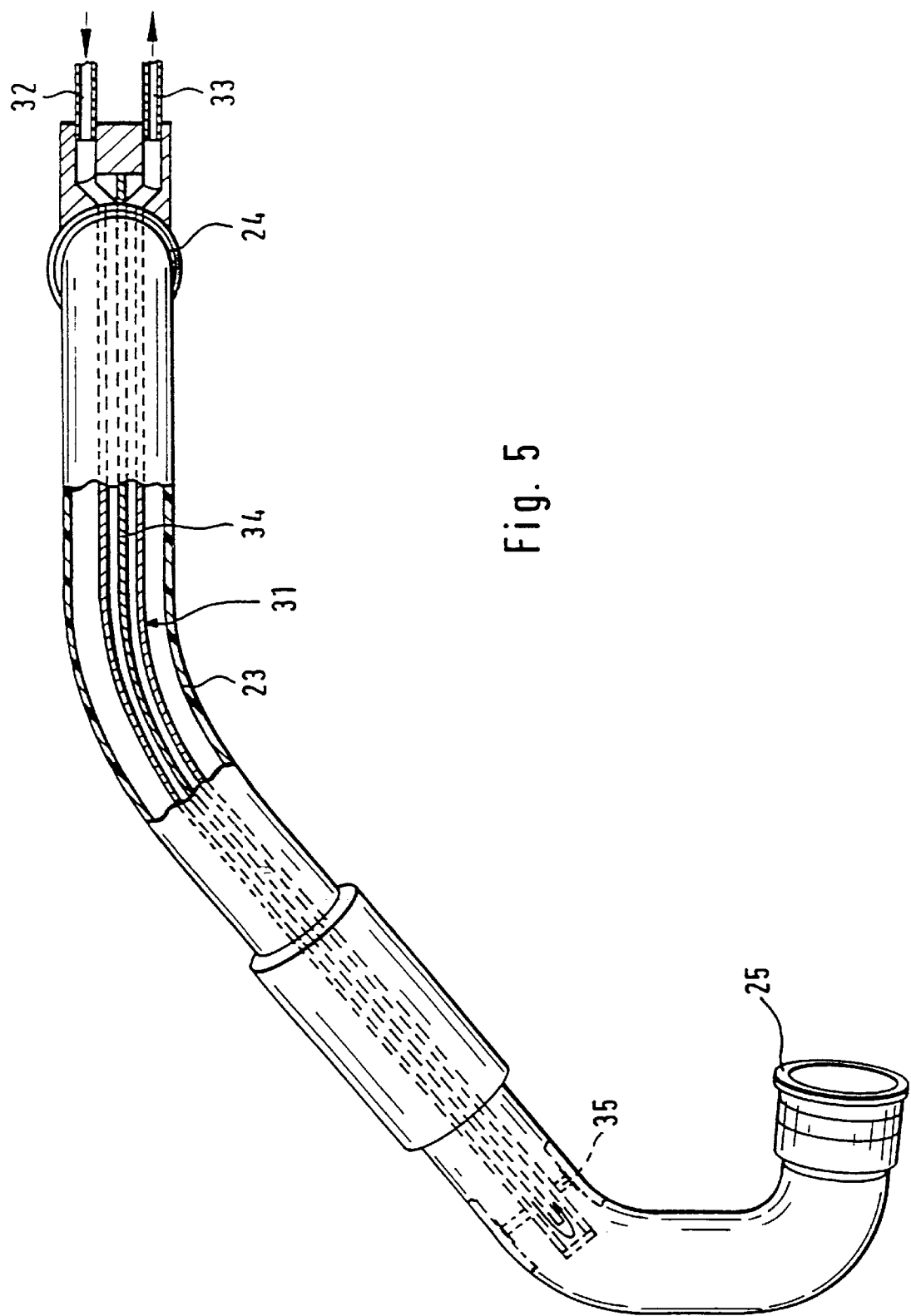
Figure 6:
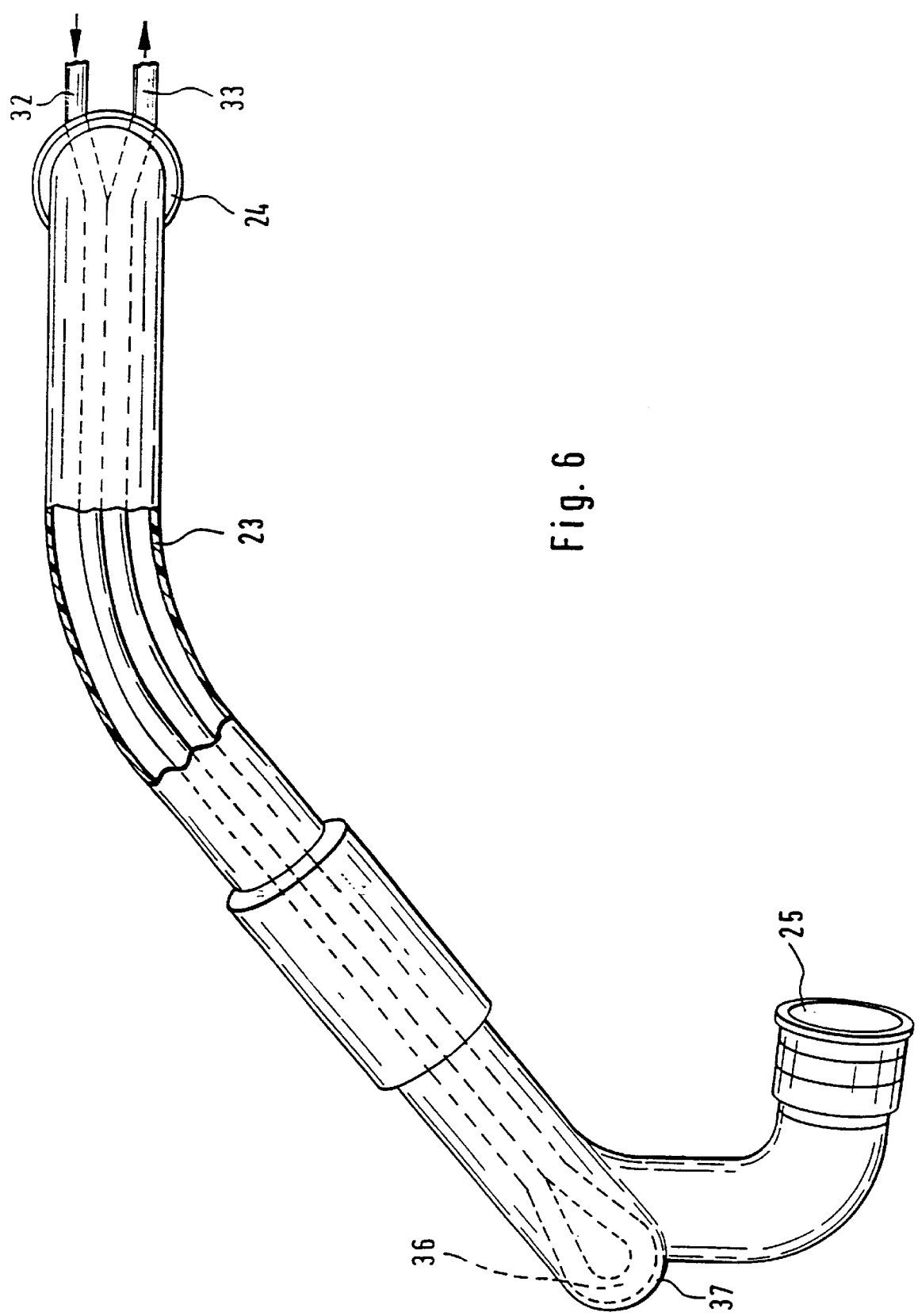

Exemplary embodiments of the invention are illustrated in the drawings and are desribed in further detail below. In the drawings, FIG. 1 shows a valve with a heating arrangement, FIG. 2 shows a valve in a top plan view, FIG. 3 shows a duct for crankcase gases with integrated heating tube, FIG. 4 shows a valve embedded in a synthetic resin body, FIG. 5 shows a first variant of a heating tube, FIG. 6 shows a second variant of a heating tube.

Figure 2:
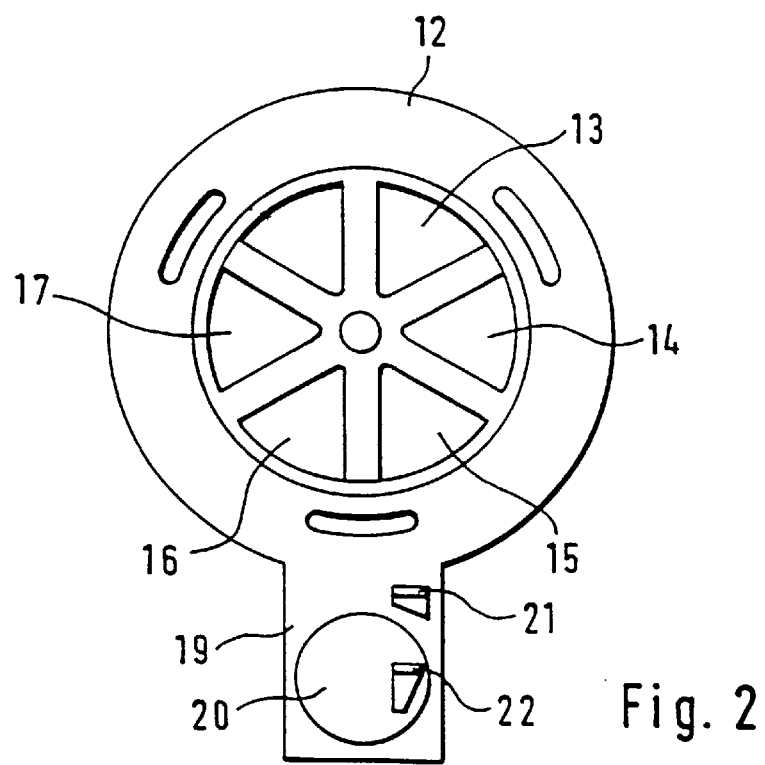

The sectional view presented in FIG. 1 shows a simple plate valve which is disposed in a duct 10. The crankcase gases flow through this duct in the direction of the arrow 11 into the clean air section of an air filter. The valve is comprised of a copper plate 12 which, as shown in FIG. 2, is provided with openings 13, 14, 15, 16 and 17. On the copper plate is a resilient valve plate 18. This plate is omitted in FIG. 2 for a clearer illustration of the openings. The copper plate 12 is provided with a projection 19. On this projection 19 there is a cold conductor element 20. Receptacles 21 and 22 are arranged on the cold conductor element 20 and on the copper plate 12, respectively. A voltage is delivered through these receptacles. As soon as the temperature of the copper plate, and hence also the temperature of the cold conductor connected to the copper plate falls below a certain reference point, a heating current flows which heats the plate. This has the advantage that no additional regulating means are necessary.

Figure 3:
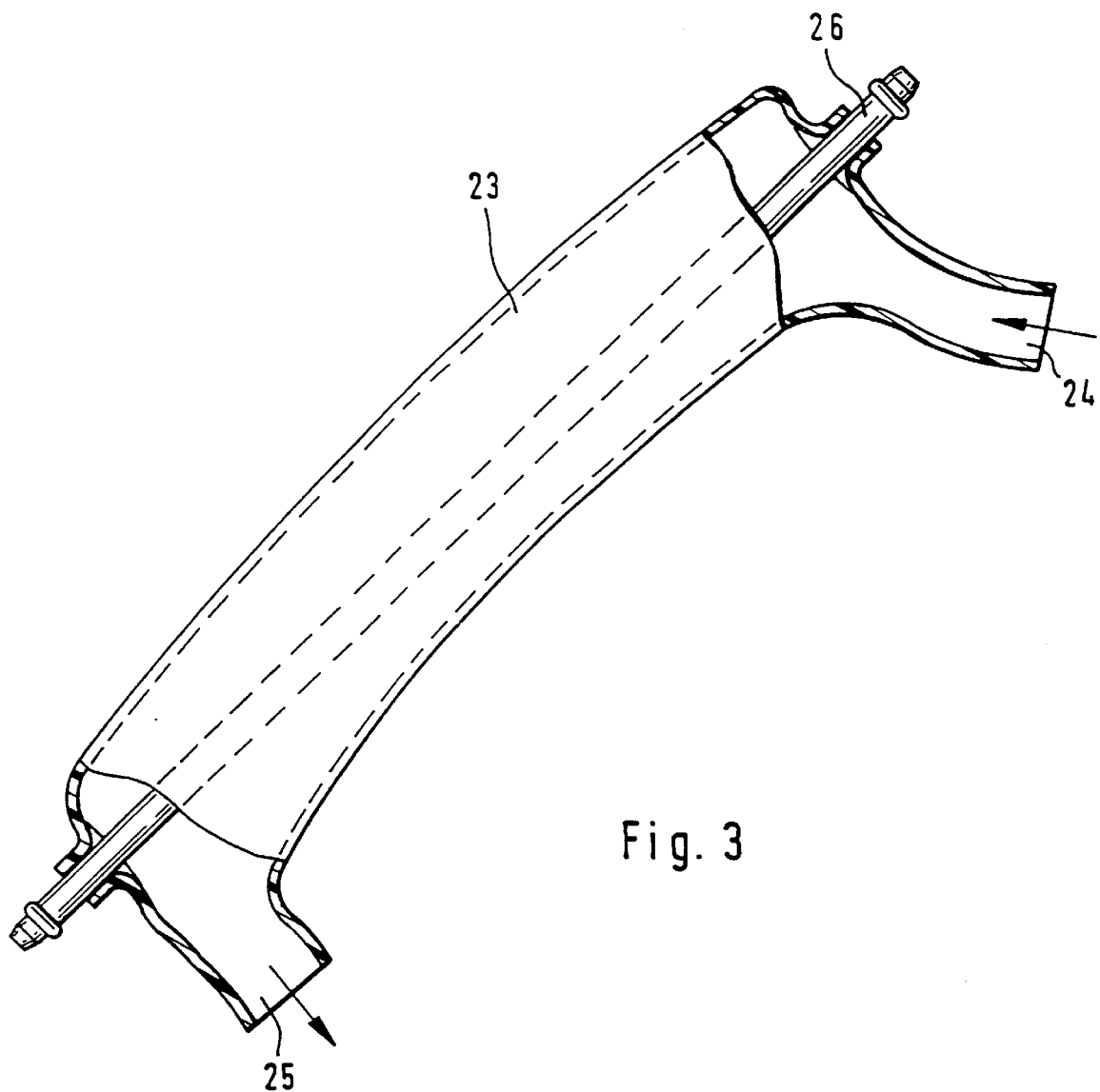

FIG. 3 shows an alternative embodiment. Here the crankcase gases pass through a hose 23. The crankcase gases flow into the upper opening 24 and leave this hose through the bottom opening 25. In the center of the hose is a tube carrying cooling water. This cooling water tube 26 is connected to the cooling circuit of a vehicle or motor and thus warms this hose up to the temperature range of the cooling water. In this way the freezing or icing up of this line and of the following lines is reliably prevented. The hose itself is provided with two cylindrical connectors through which the tube can easily be installed and made sufficiently leakproof by appropriate compression.

Figure 4:
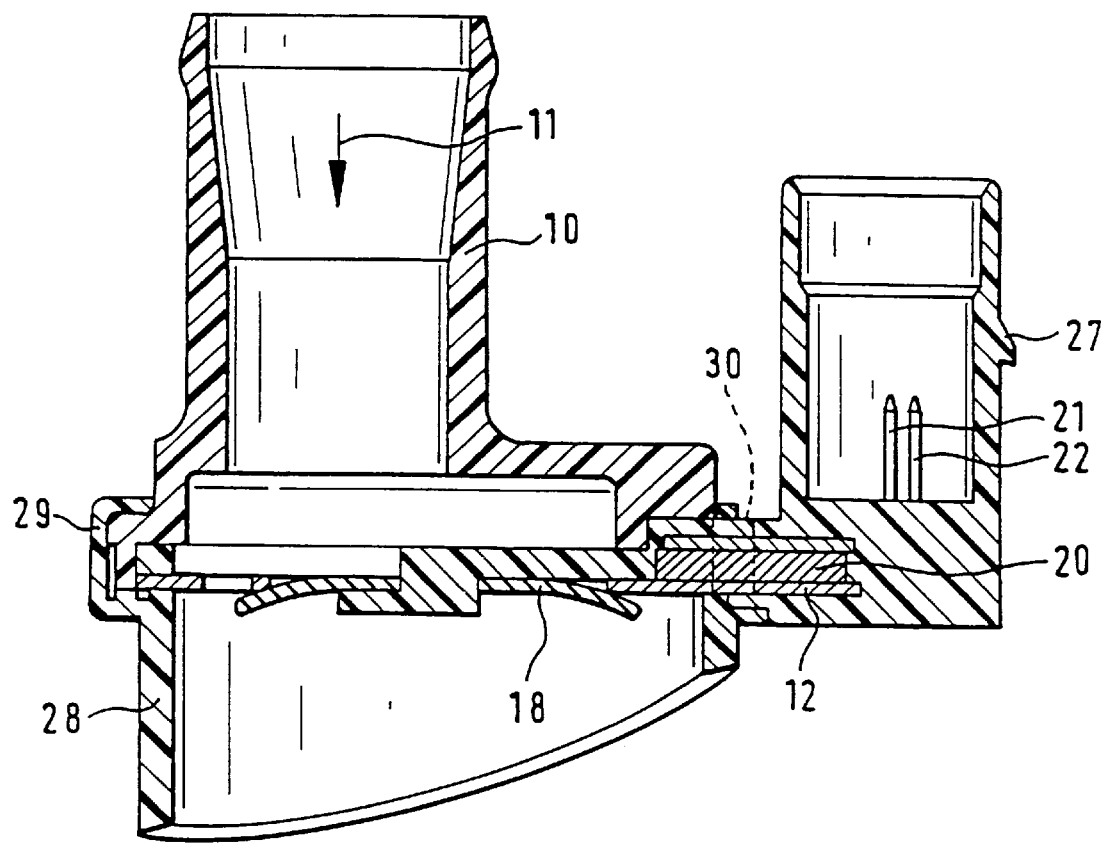

In FIG. 4 a valve is shown which is composed of a valve or copper plate 12 with a resilient valve plate 18. The valve is disposed on a tube 10. The cold conductor element 20, which is provided with prongs 21 and 22, is situated on the valve. The prong contacts are contained in a connector housing 27. The connector housing, the valve and the tube 10 are enclosed together by a synthetic resin body in the joint area. In the area 29 the synthetic resin body 28 surrounds the seam between tube 10 and the valve. Furthermore, the plastic body 28 forms a connector stub which can be connected to the intake manifold of an internal combustion engine. The connection is made, for example, through a mirror weld. For the optimum joining together of the parts, bores 30 can be provided circumferentially on tube 10, the connector part 27 or the valve, through which the synthetic resin material flows during the injection molding and thus creates a form-locking connection.

FIG. 5 shows the variant of a hose 23 through which the crankcase gases are conveyed. The crankcase gases flow in at the opening 24 and leave this hose through the opening 25. In the hose there is a tube 31 carrying cooling water, which has a fluid inlet 32 and a fluid return 33. The tube is divided into two parts. The division can be produced by a separating wall 34 located in the tube. It is also possibile to make this tube up of two tubes, one inside the other coaxially. In the forward portion of the tube the fluid is returned. This forward portion is provided with a supporting body 35. The loss of cross section around the coolant tube can be offset by giving the hose 23 a larger diameter.

FIG. 6 shows an additional variant in which a tube carrying cooling water is disposed in a hose 23, and is comprised simply of a tube bent around 180°. The bend is disposed in a pocket 37 in hose 23, so that it does not diminish the cross section.

We claim:

1. A heating arrangement for preventing freezing or icing of a duct for carrying crankcase gases from the crankcase of an internal combustion engine to the air intake, wherein an element is provided for warming the crankcase gases, said element comprising a valve which comprises at least one metal plate and a cold conductor on said plate, said cold conductor being povided with a plug contact for feeding a voltage and the valve is a pressure regulating valve.

2. A heating arrangement according to claim 1, wherein said valve is a flow limiting valve.

3. A heating arrangement according to claim 1, wherein said valve comprises valve parts injection molded within a synthetic resin body.

4. A heating arrangement according to claim 3, wherein the valve parts are snapped or locked together and have cavities which permit teeth to be formed on the synthetic resin body.

* * * * *